A. F. COOPERIDER.
TRANSMISSION GEARING FOR MOTOR VEHICLES.
APPLICATION FILED FEB. 27, 1914.

1,118,743.

Patented Nov. 24, 1914.

Witnesses

Albert F. Cooperider, Inventor
by C. A. Snow & Co.
Attorneys

UNITED STATES PATENT OFFICE.

ALBERT F. COOPERIDER, OF DELAWARE, OHIO.

TRANSMISSION-GEARING FOR MOTOR-VEHICLES.

1,118,743.  Specification of Letters Patent.  Patented Nov. 24, 1914.

Application filed February 27, 1914. Serial No. 821,456.

*To all whom it may concern:*

Be it known that I, ALBERT F. COOPERIDER, a citizen of the United States, residing at Delaware, in the county of Delaware and State of Ohio, have invented a new and useful Transmission-Gearing for Motor-Vehicles, of which the following is a specification.

The present invention relates to improvements in transmission mechanism for motor vehicles, one object of the invention, being the provision of a selective clutch mechanism employing a double cone member fixedly keyed to and upon a driven shaft in combination with slidably mounted means for engaging the same whereby a forward or reverse movement will be imparted to the driving axle and wheels of a motor vehicle.

A further object of the present invention is the provision of a motor vehicle employing a spring motor, and in which the power from the spring is transmitted to the driving axle and wheels of the vehicle through a selectively operated clutch mechanism, the main portion of which is in the same relative position at all times to the spring motor and its actuating mechanism.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
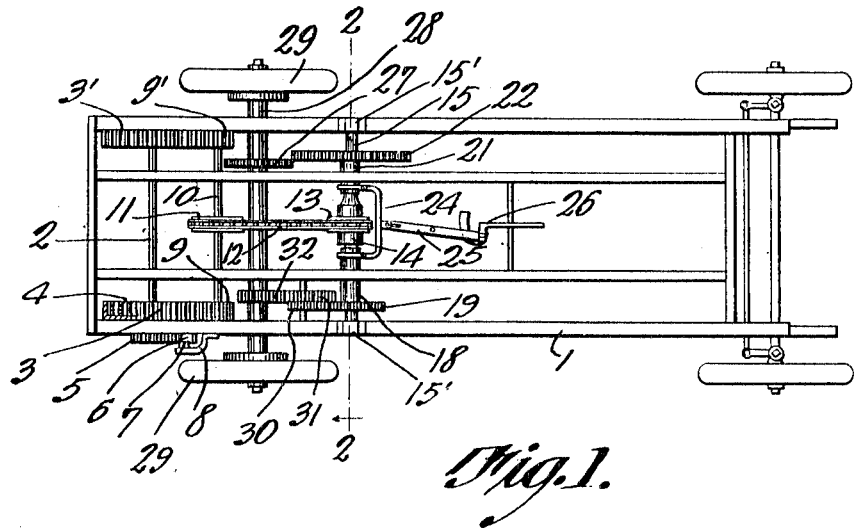
Figure 2:
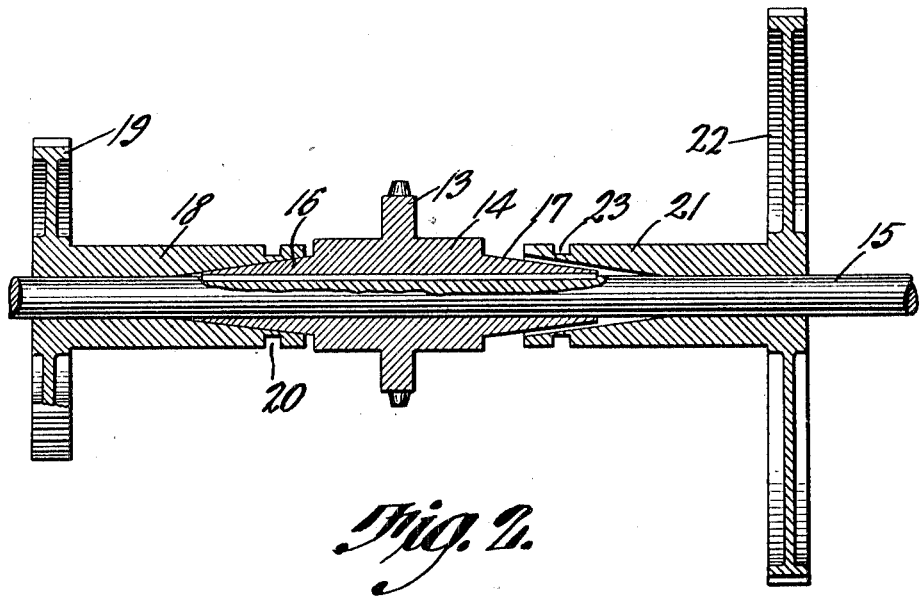

In the drawings—Figure 1 is a top plan view of the chassis of a motor car constructed according to and embodying the present invention. Fig. 2 is a section taken on line 2—2 of Fig. 1.

Referring to the drawings, the numeral 1 designates the chassis of the automobile which has journaled in the rear portion thereof, a transverse shaft 2 carrying the two large gears 3—3′. A spring motor 4 is employed and is disposed to be incased within the gear 3, its gear 5 being operated by the small pinion 6 through the crank connection 7 and the crank 8, so that the spring motor may be wound. Two small pinions 9 and 9′ mesh with the respective pinions 3 and 3′ and thus motion is transmitted to the transversely disposed driven shaft 10. This shaft is provided with a centrally disposed sprocket 11 over which is trained a sprocket chain 12, said chain being passed forwardly and around the sprocket 13 of the fixed clutch member 14. The fixed clutch member 14 is keyed upon the freely rotatable shaft 15 which is journaled on boxes 15′ carried by the chassis.

The clutch member 14 is provided with the oppositely disposed cone portions 16 and 17 which are disposed to be engaged by the cone sockets of the slidable sleeves 18 and 21 as will presently appear. The sleeve 18 is provided with the gear 19 and with a circumferential recess 20 while the sleeve 21 is provided with a large gear 22 and a circumferential recess 23.

In order to provide a means for placing one of the sleeves into engagement with one of the cones of the member 14 and the other out of engagement therewith or for placing both sleeves 18 and 21 in a neutral position, a yoke 24 is disposed to engage the respective recesses 20 and 23 and through the lever 25 may be moved to any one of the positions. The manually controlled lever 26 is disposed in the chassis in a ready position for operating the forward free end of the lever 25 so that either one of the transmission sleeves 18 or 21 may be selected. The gear 22 constitutes the forward drive gear of the present clutch mechanism while the gear 19 is the reverse drive gear.

In operation, when it is desired to drive the motor vehicle rearward, the sleeve 18 is moved so that its cone socket will engage the cone 16, as clearly illustrated in Fig. 2, at which time the gear 19 will be placed in mesh with the gear 30, which through the gears 31 and 32 operates the drive shaft 28 to which are keyed the driving wheels 29.

When it is desired to reverse the movement of the motor vehicle, the sleeve 18 is moved to disengage the cone 16 while the sleeve 21 is moved to engage the cone 17, at which time the gear 22 is placed in engagement with the gear 27 of the shaft 28. Thus it will be seen that by the mere movement of the respective sleeves 18 and 21, the various directions of propulsion of the vehicle may be selected, or the clutch members may be placed in neutral position so that the shaft 15 will be rotated freely.

Any form of steering mechanism may be provided, and the lever 26 may be controlled therefrom similar to the throttle controls of explosive engine actuated automobiles.

It is also apparent that other motive powers than a spring motor may be used for operating the present mechanism to drive the vehicle.

What is claimed is:

The combination in a motor vehicle with a supporting frame, a driven axle journaled therein and a prime mover, of a transmission mechanism interposed between the prime mover and the driven axle, including a transverse shaft, a sleeve keyed centrally thereupon and having oppositely disposed cone ends, a sprocket wheel centrally of and fast upon said sleeve, a sprocket chain connecting the sprocket wheel to the prime mover, two slidably and rotatably mounted sleeves mounted upon the last shaft, each of said sleeves being provided with a cone recess to engage its respective cone of the fixed sleeve, a large and a small gear carried respectively by said sleeve, the small gear being the reverse gear and the large gear the forward gear, a gear connected to the driven axle for engagement with the large gear, a series of gears connected to the rear axle and interposed for connection with the small gear, the large gear being out of engagement when the small gear is in engagement and vice versa, and a yoke connected to both sleeves, whereby the sleeves may be reciprocated to connect one of the gears at a time or moved centrally to place them in neutral position, the cones and cone sockets forming the connecting mediums between the sleeve and the gears.

In testimony that I claim the foregoing as my own, I have hereto affixed my signature in the presence of two witnesses.

ALBERT F. COOPERIDER.

Witnesses:
JOHN L. COOPERIDER,
ANDREW SHUSTER.

Copies of this patent may be obtained for five cents each, by addressing the "Commissioner of Patents, Washington, D. C."